United States Patent

Horino et al.

[11] Patent Number: 5,861,619
[45] Date of Patent: Jan. 19, 1999

[54] METHOD OF AND APPARATUS FOR EMBEDDING DATA INTO AN ELECTRONIC DOCUMENT BY MODULATING SPACES BETWEEN WORDS

[75] Inventors: Naoharu Horino; Masayuki Suto, both of Tokyo; Kineo Matsui, Kanagawa-pref., all of Japan

[73] Assignee: Oki Electric Industry Co., Ltd., Toyko, Japan

[21] Appl. No.: 767,229

[22] Filed: Dec. 13, 1996

[30] Foreign Application Priority Data

Dec. 28, 1995 [JP] Japan ................................. 7-343295

[51] Int. Cl.$^6$ ............................................ G06K 7/10
[52] U.S. Cl. ............................................ 235/470; 235/436
[58] Field of Search .................................. 235/435, 436, 235/470, 487, 437; 380/3, 4, 487

[56] References Cited

U.S. PATENT DOCUMENTS 5,467,447  11/1995  Vogel ........................................ 707/500
5,629,770  5/1997  Brassil et al. ............................. 380/4

OTHER PUBLICATIONS

"Electronic Marking and Identification Techniques to Discourage Document Copying", J. Brassil, et al., IEEE Transactions No. 0743–166X/94, pp. 1278–1287, 1994.

Primary Examiner—Anita Pellman Gross
Assistant Examiner—Karl Frech

[57] ABSTRACT

In a method of coding an electronic text document, the length of a space preceding a word in a line of text data of an electronic document relative to the length of a space following the word is modulated with the value of a bit of signature data. The signature data are thus embedded into the text data of the electronic document, not being easily discernible to illicit readers.

12 Claims, 3 Drawing Sheets

METHOD OF AND APPARATUS FOR EMBEDDING DATA INTO AN ELECTRONIC DOCUMENT BY MODULATING SPACES BETWEEN WORDS

BACKGROUND OF THE INVENTION

1. Field of the Invention

The present invention relates to a method of coding an electronic text document, more particularly, a method of coding an electronic text document to be transferred over a computer network, and apparatus for implementing the method.

2. Description of the Background Art

The recent development of the computer networks enables a rapid and economical distribution of electronic documents to increasingly be available. Especially, with the electronic libraries and the databases, the increasing opportunity at which a huge amount of important and valuable documents are available to the public by database search leads to the problem of illicit distribution of copyrighted material. An exact duplicate of electronic documents may instantaneously be reproduced without involving any troublesome works rather than printed documents.

In order to prevent electronic documents from being illicitly copied, techniques of embedding signature information into electronic documents are proposed. One of the techniques is to slightly shift the distance between the adjacent pairs of lines of words in an electronic document, or line pitch, in dependent upon signature information to be embedded. In accordance with this scheme, the capacity of information to be embedded is dependent upon the number of lines formed by the text on a full page. In adddtion, the line pitch is not uniform through the entire page, which may be noticed during editing.

According to another proposal, the position of a word in a line in an electronic document in a horizontal direction is shifted dependently upon signature information. The signature information conveyed is readable by comparing the document thus coded with its original one. This requires, for decoding, comparison of the coded document with its original. The word processors, e.g. ones for processing European languages, have the function of justifying the rightmost ends of lines. A hard copy of a page, reproduced from an electronic document may often be inconsistent with its original page due to the justification.

The third tactic is of discernibly deforming the font of a specific letter or character on the basis of signature information to be embedded. One of the ways of altering the text formatting or certain characteristics of textual elements is proposed in an article, J. Brassil, et al "Electronic Marking and Identification Techniques to Discourage Document Copying", IEEE Transactions No. 0743-166X/94, pp. 1278–1287, 1994.

SUMMARY OF THE INVENTION

It is therefore an object of the present invention to provide an improved method of coding an electronic text document which is not easily discernible to an unauthorized entity.

It is another object of the invention to provide apparatus for coding an electronic text document which is not easily discernible to an unauthorized entity.

In a method of coding an electronic text document in accordance with the present invention, the length of a space preceding a word in a line of text data of an electronic document relative to the length of a space following the word is modulated with the value of a bit of signature data. The signature data are thus embedded into the text data of the electronic document, not being easily discernible to illicit readers.

In accordance with an aspect of the invention, a method of coding an electronic text document comprises the steps of: preparing an electronic document carrying first text data including words forming a line with a space between the words; preparing bits of second text data to be embedded in the electronic document; and modulating a length of a first space preceding a word in a line of the first text data relative to a length of a second space following the word with a value of a bit of the second text data; whereby the second text data are embedded into the first text data.

In accordance with another aspect of the invention, there is provided a method of decoding an electronic text document carrying first text data including words forming a line with a space between the words, wherein a length of a first space preceding a word in a line of the first text data relative to a line of a second space following the word is modulated with a value of a bit of second text data, the method comprising the steps of: determining the length of the first space relative to the length of the second space with respect to a word in a line of the first text data; and allotting a binary value on the basis of the relative lengths thus determinined to form a bit of the second text data; whereby the second text data are restored in the form of a series of the bits thus formed.

Further in accordance with the invention, apparatus for coding an electronic text document comprises: a first memory for storing an electronic document carrying first text data including words forming a line with a space between the words; a second memory for storing bits of second text data to be embedded in the electronic document; an encoder interconnected to said first and second memories for modulating a length of a first space preceding a word in a line of the first text data relative to a length of a second space following the word with a value of a bit of the second text data; and output means interconnected to said encoder for reproducing the electronic document in which the second text data are embedded in the first text data.

Also in accordance with the invention, apparatus for decoding an electronic text document carrying first text data including words forming a line with a space between the words, wherein a length of a first space preceding a word in a line of the first text data relative to a length of a second space following the word is modulated with a value of a bit of second text data, comprises: input means for receiving the electronic text document; means interconnected to said input means for determining the length of the first space relative to the length of the second space with respect to a word in a line of the first text data; and means for allotting a binary value on the basis of the relative lengths thus determinined to form a bit of the second text data; whereby the second text data are restored in the form of a series of the bits thus formed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
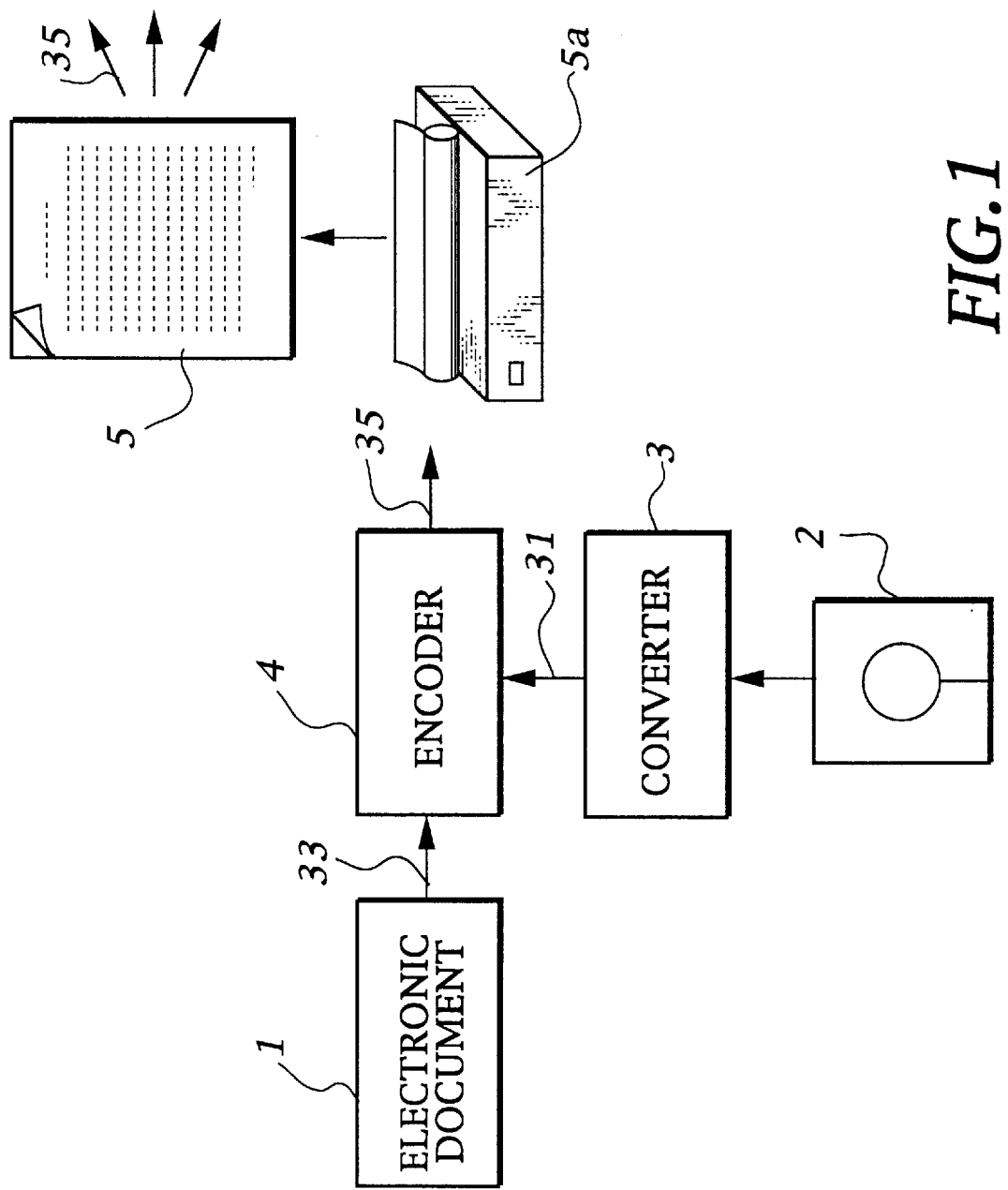
FIG. 1 schematically shows a preferred embodiment of apparatus for coding an electronic document in accordance with the present invention.

Referring to FIG. 1, a preferred embodiment of coding apparatus in accordance with the present invention is adapted to receive the text data of an electronic document 1 and code it with signature data 2 to produce a print 5 on which the resultant text thus coded is embedded. In the specification, the words "electronic document" are understood as digital data representative of text and control data forming a document.

Document 1 may be prepared, or read into, and stored in the coding system in the form of an electronic document, such as text data, by a word processor, personal computer, optical character reader, or any other storage medium, such as a flexible disk or memory card. The rectangular block 1 in the left part of the figure may represent a storage device or memory in which an electronic document is stored. Document 1 carries thereon text, or words, which may include letters, figures and/or characters. In the instant embodiment, words may be written in document 1 separately from each other with a space placed in between, as in European languages, such as English. The present invention is, however, also advantageously applicable to documents described in other languages, such as Japanese and Chinese. In practice, document 1 may be a contract, or the like.

Signature data 2 are data to be embedded into electronic document 1. In other words, with signature data 2, document 1 is encoded so as to protect the copyright of document 1 from being violated. Signature data 2 may be prepared and received by the system in the form of a storage medium, such as a flexible disk, memory card. Box 2 may also represent a storage device or memory in which signature data are stored. In the preferred embodiment, signature data 2 may include the name and contract No. of an author of document 1, the time and/or date on which document 1 is made or distributed, and/or the requirements under which document 1 is used, for example. In this manner, the words "signature data" may be understood so broadly as to include all of the aforementioned data, and sometimes referred to as specific data, which are specific to an associated electronic document.

Signature data 2 is read into a converter 3, which is adapted to convert a series of letters or characters included in signature data 2 into a series of bits 31 representing the data with a redundancy check bit or bits added. In the following description, the signals appearing on connection lines are designated by the reference numerals denoting those lines. The data representative of the name of the author of document 1 are converted into a series of two-byte Kanji codes, for example, followed by a redundancy check code, which is used, when decoded, to enable an error to be detected and corrected.

A series of bits 31 representative of the signature data thus converted is supplied to an encoder 4, which is also adapted to receive text data 33 of an electronic document 1 together with control codes. Encoder 4 functions as embedding signature data 31 provided from converter 3 into text data 33. According to the present invention, signature data 31 are embedded into the text data of an electronic document 1 in the form of the information represented by the length of the spaces between the words in the text data. How to embed signature data 2 into text data 33 will in detail be described below.

Encoder 4 has an output port 35 connected to a printer 5a, which is an output device for producing a hard copy of, or prints, the text data, in which the signature data has been embedded, in the form of a page or pages of print 5. Printer 5a may be of a type known by itself. Print 5 may sometimes be referred to as an original document in the specification. Print 5 may be duplicated in the form of paper sheets 6, FIG. 2, which are in turn distributed as symbolically depicted in FIG. 1 by arrows 35.

Figure 2:
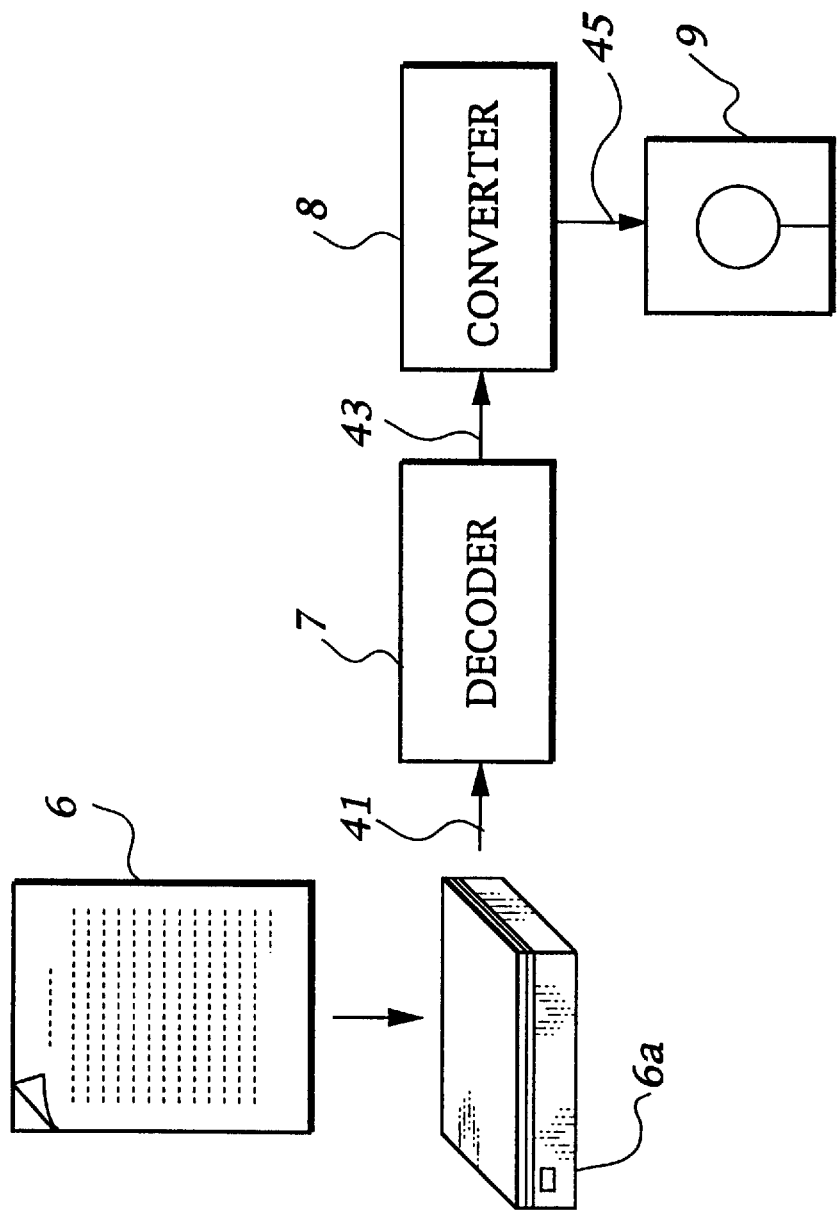
FIG. 2 schematically shows, similarly to FIG. 1, a preferred embodiment of apparatus for decoding an electronic document in accordance with the invention.

Now with reference to FIG. 2, a preferred embodiment of decoding apparatus for decoding the text data conveyed by a duplicate 6 to restore the signature data embedded in duplicate 6 to be stored into another storage medium 9, such as a flexible disk, memory card. Sheets of duplicate 6 are loaded to an optical character reader 6a, by which the text data are read into the decoder apparatus.

Optical character reader 6a is an input device comprised of an image scanner and a character recognition feature, and adapted to read in the letters and characters carried on a sheet of document 6 into the decoding system. Optical character reader 6a has an output port 41 connected to a decoder 7, which is adapted to extract or decode signature data which are embedded in duplicate 6 in the form of the length of the spaces separating the words of the text data carried on duplicate sheet 6. In order merely to restore the signature data embedded in duplicate document 6, decoder 7 may not necessarily be adapted to recognize the letters or characters per se consisting of the words on duplicate document 6, but merely determine in which position in the direction of a line the words are located. Further details of how to decode the signature data embedded in document 6 will be described below. Decoder 7 has its output port 43 interconnected to another converter 8. The signature data thus decoded will be developed from output port 43 in the form of a series of bits.

Converter 8 is adapted to receive a series of bits representative of signature data 43 thus decoded from decoder 7 and convert them into a corresponding series of letters or characters. In the preferrred embodiment, converter 8 records the resultant data of serial letters or characters 45 onto a recording medium 9, such as a flexible disk, memory card.

Figure 3:
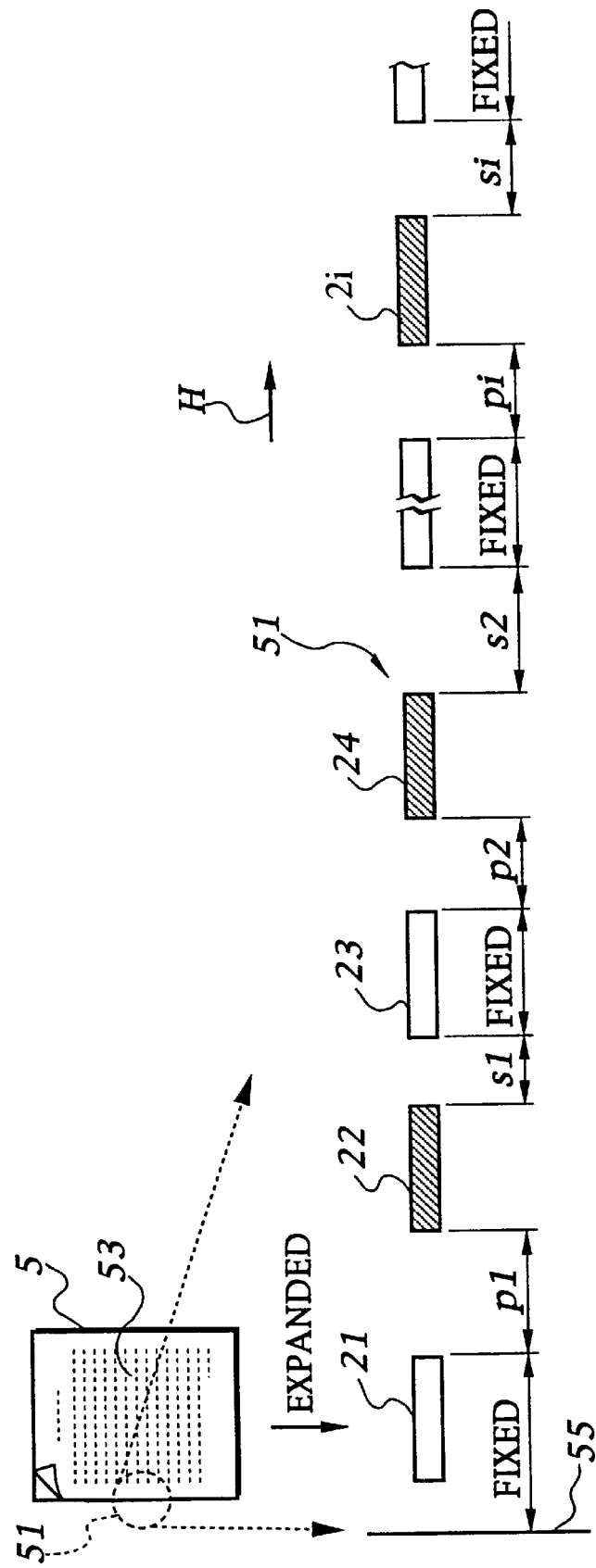
FIG. 3 is a plan view of part of a page of a document, useful for understanding how to code the text of the document by the embodiment of the coding apparatus shown in FIG. 1.

FIG. 3 exemplarily shows how the words are printed on a sheet of original document 5. In the lower part of the figure, there is shown expandedly the leftmost part 51 of a printed line 53 on print sheet 5, which includes words 21, 22 through 2i printed, where i is a natural number. Those words are of course printed in line horizontally in the direction denoted by the arrow H with spaces p1, s1, p2, s2 through pi, si placed in between, as shown in the figure. The position of word 2i is determined with respect to a reference position 55, which may be the left edge of sheet 5, for example. In the following, the reference codes p1, s1, p2, s2 through p1, si also denote the length of the spaces, i.e. the intervals of the associated words.

Now, consider the even-numbered words counted from the leftmost end of line 53. Those words 22, 24, . . . , 2i are shaded in the figure. The leftmost and rightmost words in the line are excepted from consideration since they are preceded and followed by no space, respectively. The invention is however not restricted to selecting such even-numbered words but may also be applicable to other manners of selecting words, e.g. odd-numbered words, or generally skipping a predetermined number of words. Words 22, 24, . . . 2i are preceded by spaces p1, p2, . . . , pi, and followed by other spaces s1, s2, . . . , 2i. In the following discussion, the notation (pi, si) represents the length of preceding space pi plus the length of following space Si with respect to word $2i$ in question. Coding of signature data is implemented by embedding signature information into the unit of length (pi, si).

Encoder 4 of the coding apparatus, shown in FIG. 1, encodes or modulates the length (pi, si) with the binary value of a bit consisting of signature data 31 developed from converter 3 in accordance with the rules defined in the following:

(a) If a bit in question of serial signature data 31 is binary "0", then $$pi \leftarrow (1+\rho)*(pi+si)/2, \text{ and}$$

$$si \leftarrow (1-\rho)*(pi+si)/2.$$

(b) If a bit in question of serial signature data 31 is binary "1", then $$pi \leftarrow (1-\rho)*(pi+si)/2, \text{ and}$$

$$si \leftarrow (1+\rho)*(pi+si)/2,$$

where $\rho$ is referred to as deviation defining the ratio of preceding space pi to following space Si, and set into a predetermined value, $0<\rho<1$, irrespective of word $2i$ in question. The length data (pi, si) are quanterized by encoder 4 by quantization steps, which are defined by taking account of both the image quality of a duplicated document 6 which would be deteriorated due to multiple duplication of a document and the errors which may be encountered in reading document 6 by the image scanner of optical character reader 6a of the decoding apparatus.

The rules (a) and (b) are applied to the even-numberd words 22, 24, ..., 2i to modulate the lengths (p2, s2) (p4, s4) ... (pi, si) with a series of bits representative of signature data 31 read out from signature data storage 2. An original document containing associated signature data embedded by encoder 4 in this manner will in turn be developed to printer 5a to be printed in the form of an original document 5.

Original document 5 may be copied and distributed, sometimes illicitly, into a duplicate document 6. The text data contained by a duplicate 6 is read into decoder 7 of the decoding system, FIG. 2. From the text data, the signature data contained therein is extracted in the folloing fashion:
(A) If the length (pi, si) of a word $2i$ in question satisfies the equations, $$pi=(1+\rho)*(pi+si)/2, \text{ and}$$

$$si=(1-\rho)*(pi+si)/2,$$

then a corresponding bit for forming part of serial signature data 43 is binary "0".
(B) If the length (pi, si) of a word $2i$ in question satisfies the equations, $$pi=(1-\rho)*(pi+si)/2, \text{ and}$$

$$si=(1+\rho)*(pi+si)/2,$$

then a corresponding bit for forming part of serial signature data 43 is binary "1".

The rules (A) and (B) are applied to the even-numberd words 22, 24, ..., 2i of a text line 53 captured by character reader 6a to demodulate the lengths (p2, s2) (p4, s4) ... (pi, si) into a series of bits constituting decoded signature data 43. Signature data 43 contained in a duplicate document will be restored by decoder 7 in this manner, and in turn be stored into storage medium 9 in the form of serial character data.

In summary, with the illustrative embodiment of the invention, signature data are coded into the relative length of a couple of spaces preceding and following a word in question in a print line. When decoding signature data thus encoded, it is not necessary to compare a duplicate document with its original one. In accordance with an aspect of the invention, the spacing between words in an electronic document is modulated with signature data, so that it is so much difficult for an unauthorized person to discern the signature data from a copied sheet of the document.

Signature data may repetitively be embedded into every page of an electronic document. If an electronic document has a lot of pages, then it would be a troublesome and costly work for an unauthorized person to remove the modulation from the spaces between words on those pages of the document and illicitly duplicate the pages.

One page of text data can carry signature data embedded of which the number of bits is almost equal to a half of the words contained in that page, since the signature data can be embedded into the page in the form of combinations of the lengths of the spaces preceding and following the words in the page. For example, an A4 sized page on which are printed 40 lines of 20 words in average can have approximately 400 bits of signature data embedded therein. That amount of bits is satisfactory in practice for encoding signature data of an eletronic document.

In an application of the invention, the scheme of coding the spaces preceding and following a word may be used for encrypting a secret document to be protected for security into another document, which may even be available to public. For example, text data carried by a document, such as a page of a newspaper, are modulated with data carried by a secret document by modulating the spaces preceding and following words on the page of the newspaper with the words of a secret document to be protected. When decoding the page of the newspaper, the spaces preceding and following words on the page of the newspaper are demodulated to restore the data of the secret document to be protected.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A method of coding an electronic text document, comprising the steps of:
    preparing an electronic document carrying first text data including words forming a line with space between the words;
    preparing bits of second text data to be embedded in the electronic document; and
    modulating a ratio of a length of a first space preceding a word in a line of the first text data relative to a length of a second space following the word with a value of a bit of the second text data;
    whereby the second text data are embedded into the first text data.

2. A method in accordance with claim 1, further comprising the step of selecting, prior to said step of modulating, every other one of the words, except first and last words, in a line of the first text data together with the first and second spaces preceding and following the words selected, respectively, to use the respective selected words and the first and second spaces corresponding thereto in said step of modulating.

3. A method in accordance with claim 2, wherein, in said step of modulating, the lengths of the first and second spaces are modulated with the value of a bit of the second text data in accordance with the following rules:

(a) if the bit is binary "0", then $pi \leftarrow (1+\rho)*(pi+si)/2$, and $si \leftarrow (1-\rho)*(pi+si)/2$, and (b) if the bit is binary "1", then $pi \leftarrow (1-\rho)*(pi+si)/2$, and $si \leftarrow (1+\rho)*(pi+si)/2$, where $0<\rho<1$, and pi and si represent the length of the first and second spaces, respectively.

4. A method in accordance with claim 1, wherein the second text data comprise signature data representative of a signature of an author of the electronic document.

5. A method in accordance with claim 1, wherein the second text data comprise secret data to be protected for security from being available to public, the electronic document being available to public.

6. A method of decoding an electronic text document carrying first text data including words forming a line with space between the words, with a length of a first space preceding a word in a line of the first text data relative to a length of a second space following the word forming a ratio which is modulated with a value of a bit of second text data, comprising the steps of:

determining the ratio of the length of the first space preceding a word in a line of the first text data relative to the length of the second space following the word in the line of the first text data; and allotting a binary value on the basis of the ratio thus determined to form a bit of the second text data;

whereby a series of the bits thus formed are representative of the second text data.

7. Apparatus for coding an electronic text document, comprising:

a first memory for storing an electronic document carrying first text data including words forming a line with space between the words;

a second memory for storing bits of second text data to be embedded in the electronic document;

an encoder coupled to said first and second memories for modulating a ratio of a length of a first space preceding a word in a line of the first text data relative to a length of a second space following the word with a value of a bit of the second text data; and output means coupled to said encoder for reproducing the electronic document in which the second text data are embedded in the first text data.

8. Apparatus in accordance with claim 7, wherein said encoder selects, prior to modulating, every other one of the words, except first and last words, in a line of the first text data together with the first and second spaces preceding and following the words selected, respectively, to use the respective selected words and the first and second spaces corresponding thereto for modulating.

9. Apparatus in accordance with claim 8, wherein, said encoder modulates, the lengths of the first and second spaces with the value of a bit of the second text data in accordance with the following rules:

(a) if the bit is binary "0", then $pi \leftarrow (1+\rho)*(pi+si)/2$, and $si \leftarrow (1-\rho)*(pi+si)/2$, and (b) if the bit is binary "1", then $pi \leftarrow (1-\rho)*(pi+si)/2$, and $si \leftarrow (1+\rho)*(pi+si)/2$, where $0<\rho<1$, and pi and si represent the length of the first and second spaces, respectively.

10. Apparatus in accordance with claim 7, wherein said output means comprises a printer coupled to said encoder for producing a hard copy of the electronic document in which the second text data are embedded in the first text data.

11. Apparatus for decoding an electronic text document carrying first text data including words forming a line with space between the words, with a length of a first space preceding a word in a line of the first text data relative to a length of a second space following the word forming a ratio which is modulated with a value of a bit of second text data, comprising;

input means for receiving the electronic text document;

means coupled to said input means for determining the ratio of the length of the first space preceding a word in a line of the first text data relative to the length of the second space following the word in the line of the first text data; and means for allotting a binary value on the basis of the ratio thus determined to form a bit of the second text data;

whereby a series of the bits thus formed are representative of the second text data.

12. Apparatus in accordance with claim 11, wherein said input means comprises an optical character reader for optically reading a copy of a text document to form the electronic text document corresponding to the text document.

* * * * *